United States Patent [19]
Walker

[11] Patent Number: 5,217,121
[45] Date of Patent: Jun. 8, 1993

[54] STORAGE RACK

[75] Inventor: Erwin Walker, Hohentengen, Fed. Rep. of Germany

[73] Assignee: Croon & Lucke Maschinenfabrik GmbH, Mengen, Fed. Rep. of Germany

[21] Appl. No.: 723,464

[22] Filed: Jun. 28, 1991

[30] Foreign Application Priority Data

Jun. 29, 1990 [DE] Fed. Rep. of Germany ....... 4020864

[51] Int. Cl.⁵ .............................................. B65D 19/44
[52] U.S. Cl. ...................................... 211/41; 211/59.4
[58] Field of Search ............... 211/41, 49.1, 59.4, 211/40, 150; 410/32; 108/55.3; 206/449

[56] References Cited

U.S. PATENT DOCUMENTS

| 1,926,551 | 9/1933 | Miller | 410/32 |
| 3,812,975 | 5/1974 | Gutierrez | 211/40 |
| 4,317,514 | 3/1982 | Noren | 211/41 X |
| 4,572,382 | 2/1986 | Niederprum | 211/150 |
| 4,733,781 | 3/1988 | Gerlach | 211/41 |
| 4,976,092 | 12/1990 | Shuert | 211/41 X |
| 5,005,712 | 4/1991 | Niederprum | 211/41 X |

FOREIGN PATENT DOCUMENTS

| 0215328 | 3/1987 | European Pat. Off. |
| 3807663 | 9/1989 | Fed. Rep. of Germany |
| 3811310 | 10/1989 | Fed. Rep. of Germany ........ 312/42 |

Primary Examiner—David A. Scherbel
Assistant Examiner—Derek J. Berger
Attorney, Agent, or Firm—Bachman & LaPointe

[57] ABSTRACT

Horizontally arranged storage rail for securing, with spacing, products for storage, such as shaped metal sheets, plastic components or the like, in a storage rack, such as for example a pallet or the like, with the aid of latches rotatably mounted on bolts. It is possible, when placing the product for storage into the storage rack, to swivel a latch located in a ready position into a working position while at the same time an adjacent latch moves from a rest position below an upper edge of the storage rail into the ready position. The latch is assigned a weight which holds the latch in the ready position.

14 Claims, 4 Drawing Sheets

FIG. I 5,217,121

STORAGE RACK

BACKGROUND OF THE INVENTION

The invention relates to a horizontally arranged storage rail for securing, with spacing, products for storage, such as shaped metal sheets, plastic components or the like, in a storage rack, such as for example pallet or the like, with the aid of latches rotatably mounted on bolts, it being possible when placing the product for storage into the storage rack to swivel a latch located in a ready position into a working position while at the same time an adjacent latch moves from a rest position below an upper edge of the storage rail into the ready position.

DE-OS 3,811,310 has already disclosed, for example, a stacking column for stacking stored products of approximately identical shape and size with mutual spacings, latch lifters being provided arranged on top of one another.

When a product for storage is laid on a latch lifter located in the ready position, it moves into a working position. At the same time, a latch lifter arranged on it is swivelled by a control arm out of its rest position into its ready position.

The arrangement shown in this publication can be used on vertical stacking columns but is not suitable for horizontally arranged storage rails which serve for securing, for example, vertically aligned stored products, metal sheets or similar preforms.

Horizontally arranged storage rails are disclosed on the other hand in DE-OS 3,807,663. Here. corresponding latch lifters are arranged rotatably on bolts, in which case however these latch lifters are connected to one another via a linkage. These latch lifters have at one end an axis of rotation about which the latch lifter rotates. When swivelling the latch lifter out of its rest position into the ready position and afterwards into the working position, the said latch lifter describes a curve which has proven very unfavorable when loading the storage rack. Furthermore, the securing of the stored product is effected by means of a fastening lever which additionally requires a separate mimic for its corresponding movement.

The dependency of the movement of the individual latch lifters on the linkage has also proven unfavorable since this linkage does not have any fastening of the latch lifter in its working position. To this extent, the stored product can easily fall forward.

SUMMARY OF THE INVENTION

The inventor has set himself the task of developing a storage rail of the abovementioned type which guarantees a secure fastening of the stored product and operates in a fault-free manner when loading in the product for storage.

This object is achieved in that the latch is assigned a weight which holds the latch in the ready position.

A fundamental conception of the present invention is the arrangement of the aforesaid weight which permits a movement of the individual latches independently from one another. In conjunction with a stop, the weight ensures the maintenance of the latch in the ready position.

Although it is certainly conceivable and also should be included in the present invention that the weight itself is arranged on the latch, in a preferred embodiment the weight is to be a component of a control latch which, in addition to the latch, is preferably also rotatably mounted on the same bolt. As a result, the movement of the weight is triggered by the latch movement so that with the same rotational movement of the latch the weight can move through a greater rotational path and as a result its center of gravity is more effective.

In a preferred embodiment, the latch consists of a holding arm against which the product to be stored strikes and a control arm, in which case both arms are arranged approximately at right angles to one another. In the vicinity of the crossing point of control arm and holding arm the bolt is intended to penetrate the latch. In contrast with the prior art, as described above, the latch now no longer has any support surface by means of which the product for storage was raised during the curve movement of the latch. The product for storage can slide along the storage rail and, at the same time, carry out the corresponding movement of the latch from the ready position into the working position.

It is intended that a pin will project from the latch, and here in particular from the control arm, which pin engages between two prongs of the control latch. When the pin strikes against the prongs, said pin causes, on the one hand, the control latch to be entrained during the rotational movement of the latch and, on the other hand, a limiting of the rotational movement of the control latch. Furthermore, in the present exemplary embodiment a further prong is provided on the control latch, which prong strikes against the following bolt in the rest position of the latch. As a result, the rotational movement of the control latch is also limited. It is conceivable that, instead of the additional prong, that prong by means of which the control latch, in cooperation with the abovementioned pin, is given a rotational movement, is used in the same manner.

The weight is preferably located above the bolt, a connecting line between a central point of the weight and the central axis of the bolt enclosing an acute angle with a longitudinal axis of the prong. As a result, it is ensured that the weight is located on one side of the bolt in the rest position of the latch, i.e. when the prong rests against the following bolt, and thus supports the resting of the prong against the following bolt. If the latch is now rotated, the abovementioned pin travels through the space between the two prongs and, after a short rotational movement from below, strikes against the one prong. In a further rotational movement, the pin entrains the control latch until the weight has travelled beyond its apex point above the bolt. Afterwards, the weight drops and, as a result, the control latch continues to rotate independently of a rotational movement of the latch, until the lower prong strikes against the pin from below. As a result, the weight is displaced to a relatively large extent so that it exerts a higher pressure effect on the latch which, as a result, is held in the ready position.

In the ready position, the control arm of the latch strikes against a pin of a following latch, in which case it has proven favorable if the following pin is the pin which penetrates the control arm and causes on the other hand the rotational movement of the control latch. As a result, however, an additional stop pin does not have to be dispensed with.

If the latch now continues to be rotated, the control arm entrains the following latch by means of the pin against which the said arm strikes, so that the said latch is swivelled into the ready position. In the rest position of the preceding latch, the following latch is located at the end of the movement in the ready position. Here, the rotational movement of the latch located in the working position is stopped by the control arm of this latch striking against the following bolt from below.

Furthermore, constructed on the following latch is a control edge along which, during the swivelling of this latch into its working position, a further pin of the preceding latch, which is already located in the working position, slides, as a result of which this preceding latch is now definitively locked.

This arrangement according to the invention permits a frictionless loading of products for storage into a corresponding storage rack which is equipped with rails of this kind. Of course, the rails can also be used even without storage racks, such as for example pallets.

Preferably, a storage rail consists of two strips running parallel to one another, between which the bolts with the latches are arranged with the same spacing. However, in a particular case a strip from which the corresponding bolts project can also be sufficient. Furthermore, it may also prove advisable for technical reasons if the latches on subsequent bolts are arranged laterally offset with respect to one another. For the same reasons, the control latches of subsequent latches could then also be located in each case on opposite sides of these latches.

BRIEF DESCRIPTION OF THE DRAWING

Further advantages, features and details of the invention result from the following description of preferred exemplary embodiments as well as with reference to the drawing, in which.

DETAILED DESCRIPTION OF THE PREFERRED EMBODIMENT

Figure 1:
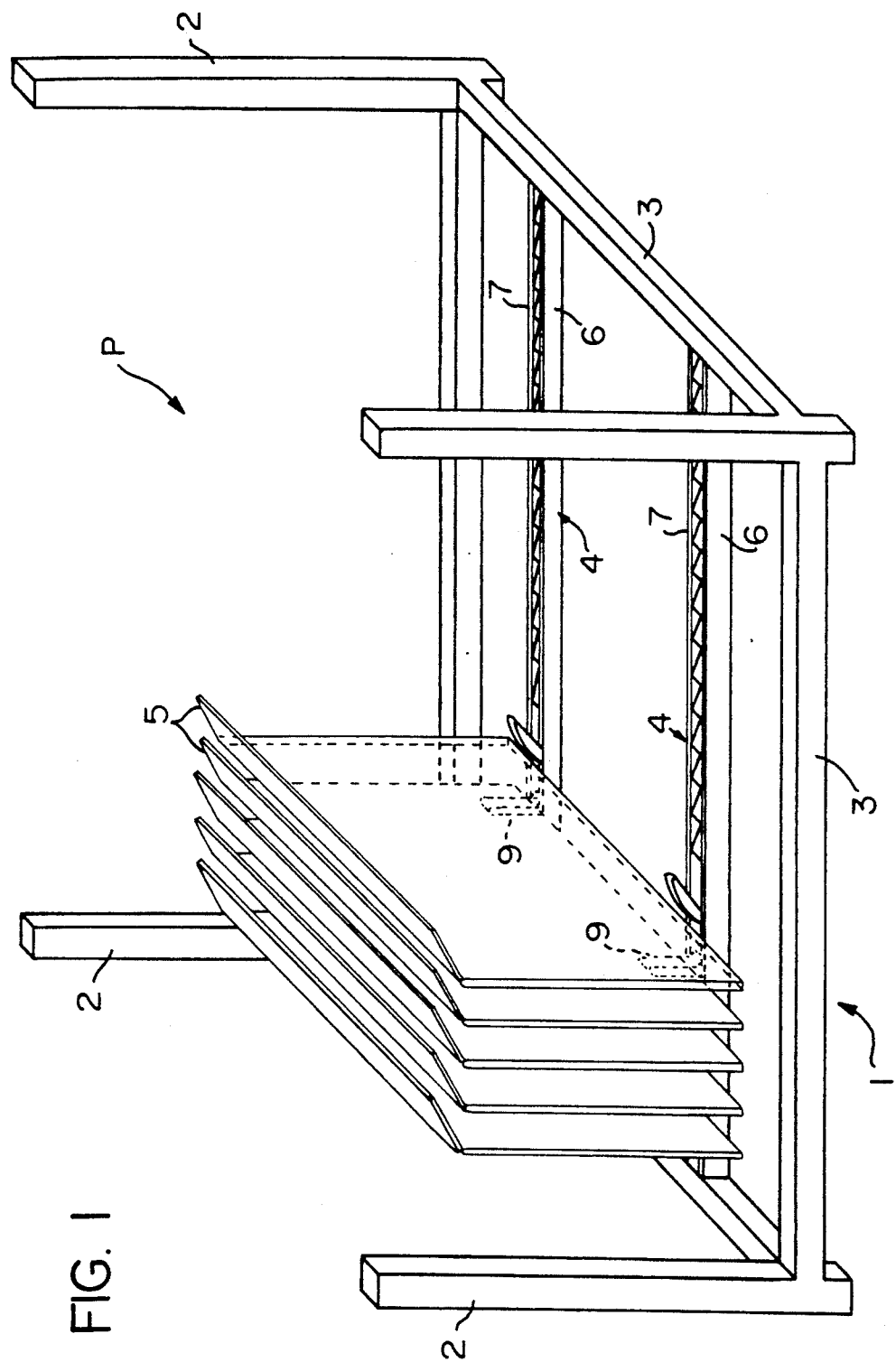
FIG. 1 shows a perspective illustration of a storage rack having storage rails according to the invention in the position of use.

A pallet P according to the invention or similar storage rack consists according to FIG. 1 essentially of a frame rack 1 with side columns 2 which are connected to one another by means of floor struts 3. Furthermore, storage rails 4 are arranged between two opposite floor struts 3. Processed metal sheets 5 of a product for storage are already located on these storage rails 4.

Figure 4:
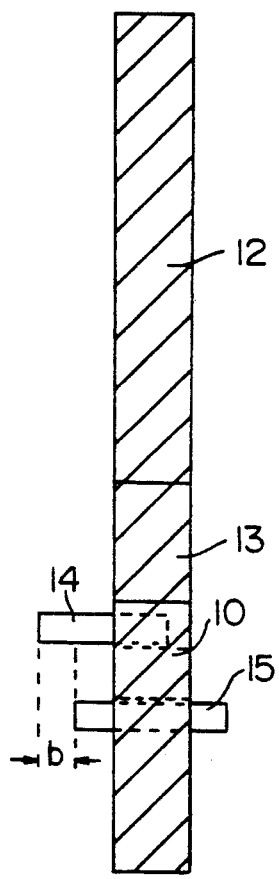
FIG. 4 shows a longitudinal section through a latch along the line IV—IV in FIG. 2.

The storage rail 4 has two strips 6 and 7 in the form of elongate rectangular strips which run parallel to one another spaced from one another. Strips 6 and 7 are fastened to the floor strut 3 of the pallet P preferably by welds. Between and transversely to the strips 6 and 7 bolts 8 are arranged at fixed intervals, on which bolts latches 9 are rotatably mounted. For this purpose, the bolts 8 penetrate in each case one bore 10 in the latch 9, it being possible to incorporate into the bore 10 a plastic sheath 11 for receiving the bolt 8. Each latch 9 has according to FIG. 2 a holding arm 12 and a control arm 13, holding arm 12 and control arm 13 running approximately at right angles to one another. The bore 10 for receiving the bolt 8 is provided near to the point of intersection of holding arm 12 and control arm 13. The control arm 13 is penetrated by circular-cylindrical pins 14 and 15 which are securely located with a snug fit in corresponding bores. However, while the pin 14, as shown in FIG. 4, only protrudes on one side from the latch 9, the pin 15 projects from the control arm 13 on both sides. At the same time, the pin 14 projects beyond the pin 15 by a length b on one side in the illustrated exemplary embodiment.

Figure 2:
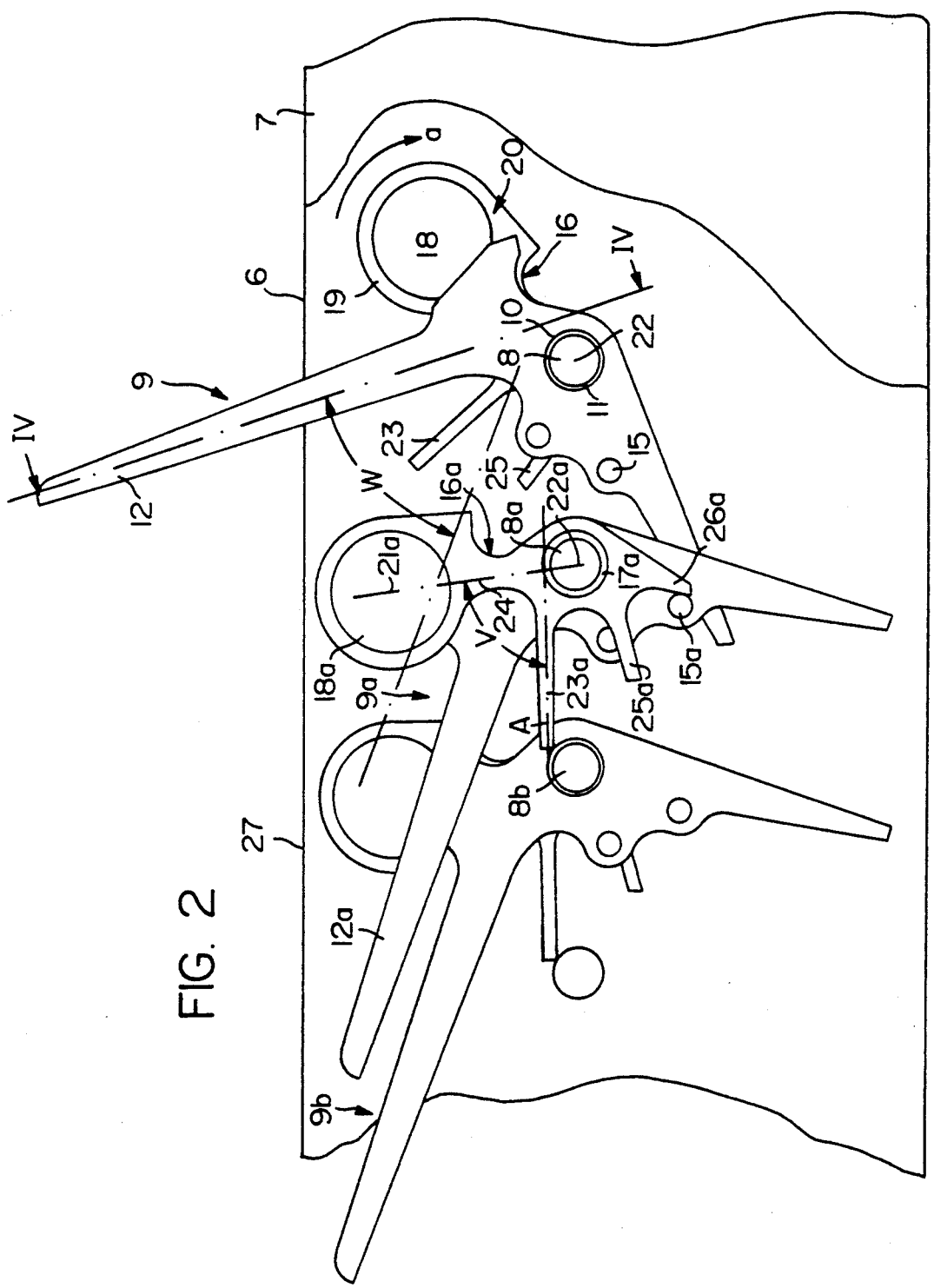
FIG. 2 shows a side view of a cut-away portion of a storage rail according to the invention having a latch in the ready position and two latches in the rest position.

In FIG. 2, the latch 9 is located in the ready position while the latches 9a and 9b are shown in the rest position. The latch 9 is assigned a control latch 16 which is also mounted rotatably or swivelably on the bolt 8. For this purpose, the control latch 16 has a bore 17a penetrated by the bolt 8.

The control latch 16 has a special recess which determines its mode of operation described later. Above the bore 17a in the rest position of the latch 9a or 9b is a weight 18 inserted into a recess 19 of a lever piece 20. The central point 21a of this disk-shaped weight 18 is mounted in front of the central axis 22a of the bolt 8a or 8b. As a result, it is ensured that the control latch 16 does not drop in the direction of rotation a. It is held in this position and, specifically, by a prong 23a which strikes against the next bolt 8b following the bolt 8a and at the same time projects approximately at right angles from the control latch 16. Correspondingly, a longitudinal axis A of the prong 23a encloses an acute angle v with a connecting line 24 between central point 21 and central axis 22.

Provided below the prong 23a are two further prongs 25a and 26a which cooperate with the pin 15a. In the rest position shown in FIG. 2, the pin 15a strikes against the lower prong 26a and thus holds the latch 9a in the rest position since a rotation of the control latch 16 is prevented by the striking of the prong 23a against the bolt 8b. If the latch 9a is rotated about the bolt 8a in the direction a, the pin 15a is released by the prong 26a, travels through a space between prong 26a and 25a and then strikes the prong 25a. During a further rotation in the direction a, the control latch 16a is now also caused to rotate until the central point 21 travels beyond its apex point above the central axis 22 and the weight 18 drops by itself a certain distance in the direction a due to its gravity. This drop is intercepted again by the prong 26a striking against the pin 15a.

Figure 5:
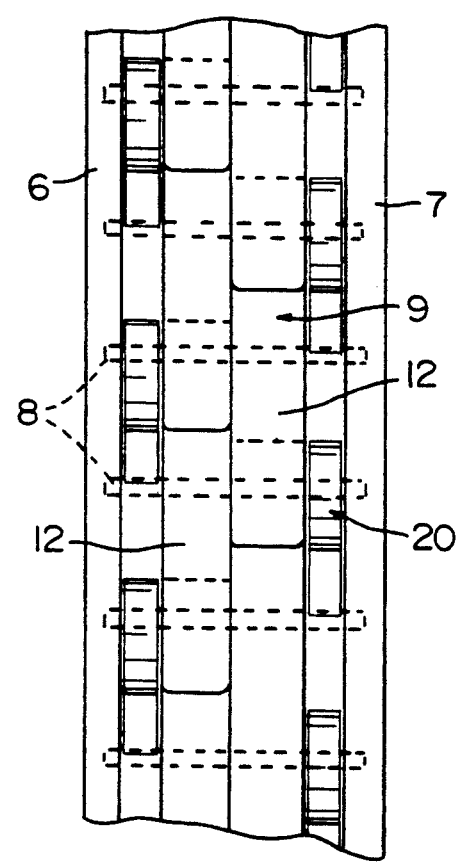
FIG. 5 shows a top view of a portion of a storage rail according to the invention.

As is particularly clear from FIG. 5, the individual latches 9 lying behind one another are alternately laterally offset with respect to one another and arranged to slide past one another. The control latches 16 assigned to them are mounted in each case between the corresponding latches 9 and one of the strips 6 or 7.

The arrangement according to the invention functions as follows:

For a ready position, the first latch 9 is swivelled about the bolt 8 in the direction of rotation a through an angle w. At the same time, the pin 15 engages below the prong 25 of the control latch 16 and causes the control latch 16 itself to be swivelled about the bolt 8 in the direction a. After passing beyond the apex point of the weight 18, the weight falls in the direction of rotation a until the prong 26 strikes against the pin 15. Further rotation of the latch 9 is prevented by the control arm 13 striking against the pin 15a of the following latch 9a.

The weight 18 is configured in such a way that in this position, due to its gravity, it produces a torque which is of such a magnitude that it holds the latch 9 in the ready position without causing the latch 9a to adopt a rotational or swivelling movement. The latch 9 is positioned by the striking of the control arm 13 against the pin 15a.

The latches 9a and 9b are still located below an upper edge 27 of the storage rail 4. The pin 15a prevents a further falling back of the latch 9, the bolt 8b on which the prong 23a rests prevents the weight 18a falling forward.

Figure 3:
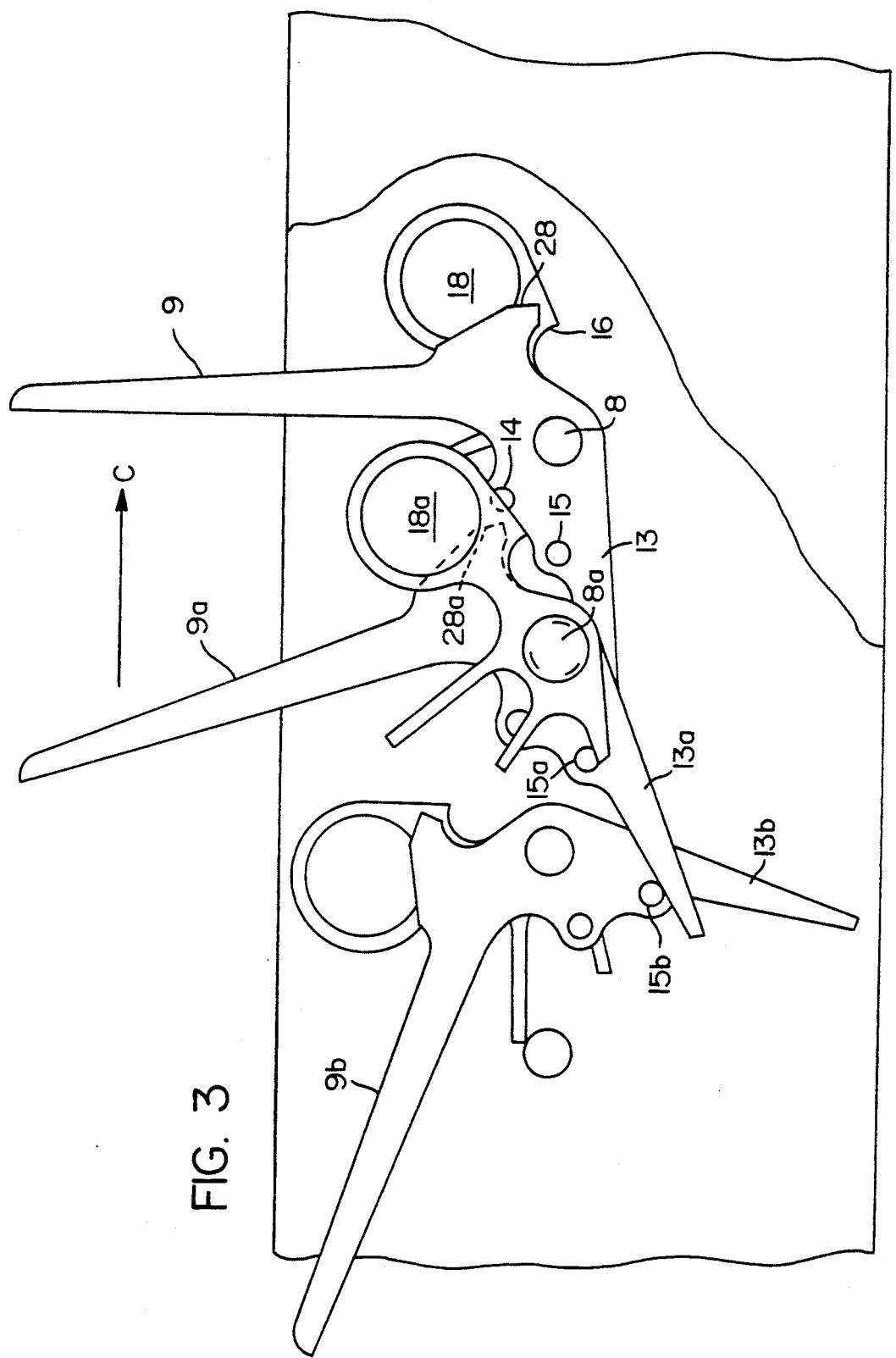
FIG. 3 shows a side view of a cut-away portion of a storage rail according to the invention having a latch in the working position, a latch in the ready position and a latch in the rest position.

According to FIG. 3 a metal sheet 5 for storage in the direction c is pushed over the storage rail 4 against the holding arm 12 of the latch 9, the said holding arm continues to rotate about the bolt 8 in the direction a, the control arm 13 entraining the latch 9a by means of the pin 15a. As a result, the latch 9a is swivelled into a ready position.

At the same time, during the swivelling the part of the pin 15a which projects toward the control latch 16a engages underneath the prong 25a of the control latch 16a and causes it to rotate also. The weight 18 of the control latch 16a is rotated via its apex point and also falls in the direction a. This rotational movement is stopped by the striking of the prong 26a against the pin 15a on the one hand and of the control arm 13a of the latch 9a against the pin 15b of the latch 9b on the other hand. The latch 9a is then located in the ready position, the latch 9b is still supported under the upper edge 27 of the storage rail 4.

As illustrated in particular in FIG. 3 by dashed lines, the control arm 13 of the latch 9 engages in its working position underneath the bolt 8a. The working position of the respective latch 9 is thus defined by the bolt 8a.

If the next latch 9a is placed in the working position, a control edge 28a slides along the pin 14, which is already secured, of the latch 9. As a result, the latch 9 is definitively secured and can now no longer be moved counter to the direction of rotation a.

In the described storage rail 4, all the latches 9 which are arranged in each case in two rows offset with respect to one another are of identical construction. Only the pins 14 project in each case from the latch 9 in the direction opposite to the corresponding control latch 16.

The length of the holding arms 12 of the latches 9 is designed such that a product for storage, for example metal sheets 5, plates or the like, can be held in a vertical storage position between two latches 9 and 9a. The distances of the individual latches 9 from one another are selected to correspond to the thickness of the respective products to be stored. For protective storage of the products to be stored or for filling up excessively large spacings between the individual latches and the product to be stored, the latches 9 can be covered with a correspondingly thick elastic material such as, for example, foam, felt or the like.

The advantage of a stacking rail having latches 9 arranged offset with respect to one another consists in being able to keep the spacings between the latches 9 very small.

A pallet P equipped with the storage rail 4 described above functions all in all as follows: According to FIG. 1, a metal sheet 5 to be stacked in the vertical position strikes against the latches 9 located to the far left in FIG. 1. These latches 9 are in the ready position at this time. By means of the striking of the metal sheet 5, the latches 9 are forcibly swivelled into the working position. By means of the lowering of the metal sheet 5 at the first latch 9 and by the resulting transfer of the latch into its working position, the adjacent latch 9a passes into the ready position so that the said latch can now also be swivelled into the working position by a correspondingly inserted metal sheet 5. As a result, the following latch 9b passes in turn into the ready position.

Metal sheets 5 can be stacked behind one another until all the latches 9 are occupied. If this is the case, the last latch is secured by a securing latch which is not described here individually.

When unloading a corresponding pallet P, the reverse procedure is adopted. Initially, the metal sheet 5 located to the far right is removed, as a result of which the following latch 9 is released and swivelled into the ready position. At the same time, the control edge 28 moves over the pin 14 of the following latch 9. The following metal sheet 5 can now be pulled over the latch 9 located in the ready position, in which case this latch is further swivelled about the bolt 8 until the holding arm 12 comes to rest below the upper edge 27 of the storage rail 4. This process is repeated until all the metal sheets 5 are removed from the pallet P.

I claim:

1. A horizontally arranged storage rack for securing for storage products spaced from each other, which comprises: a storage rack having an upper edge; a plurality of latches for spacing said products, said latches being rotatably mounted open said storage rack adjacent one another with each latch being swivelable from a rest position below the upper edge of said storage rack, to a ready position above the upper edge of said storage rack and to a working position above the upper edge of said storage rack and above the ready position for holding said products; wherein one of said latches is swivelable from said ready position into said working position while at the same time an adjacent latch moves from the rest position into the ready position; a control latch for each of said latches rotatably mounted adjacent each latch; and a weight arranged on each control latch which holds each latch in the ready position, wherein each latch is rotatably mounted on bolts and includes a holding arm and a control arm arranged approximately at right angles to each other, and wherein each control latch includes at least two prongs, and wherein a pin projects from each latch which pin is located between the two prongs of the control latch.

2. A storage rack according to claim 1 wherein each latch and control latch associated therewith are mounted on the same bolt.

3. A storage rack according to claim 1 wherein said pin projects from the control arm.

4. A storage rack according to claim 1 wherein a prong projects from each control latch, which prong strikes in the rest position of the latch against the bolt of the adjacent latch.

5. A storage rack according to claim 4 wherein each weight is arranged above each bolt and wherein a connecting line between a central point of the weight and the central axis of the bolt encloses an acute angle (v) with a longitudinal axis (A) of the prong.

6. A storage rack according to claim 5 wherein each latch is rotatable about its bolt, and said pin is operative to first travel through a space between the two prongs, then strike against one of said prongs, and then cause the control latch to rotate until the weight travels beyond its apex point above the bolt.

7. A storage rack according to claim 6 wherein the rotational movement of the control latch is operative to continue after the apex point is passed, one of said prongs becoming released from the pin until the other of said prongs strikes against the pin.

8. A storage rack according to claim 1 wherein the control arm is operative to strike in the ready position against a pin of the following latch, and during a rotation into the working position above said pin is operative to move the following latch into the ready position.

9. A storage rack according to claim 8 wherein said pin penetrates the control arm and projects beyond said control arm on both sides thereof.

10. A storage rack according to claim 1 wherein the control arm of a latch strikes in the working position of said latch against the following bolt from below.

11. A storage rack according to claim 1 wherein each latch forms a control edge against which a pin of the adjacent latch located in the working position strikes.

12. A storage rack according to claim 1 wherein said rack includes two strips running parallel to one another between which said bolts are arranged with the same spacing.

13. A storage rack according to claim 1 wherein the latches are arranged on bolts laterally offset with respect to one another and slide past one another.

14. A horizontally arranged storage rack for securing for storage products spaced from each other, which comprises: a storage rack having an upper edge; a plurality of latches for spacing said products, said latches being rotatably mounted on said storage rack adjacent one another with each latch being swivelable from a rest position below the upper edge of said storage rack, to a ready position above the upper edge of said storage rack and to a working position above the upper edge of said storage rack and above the ready position for holding said products; wherein one of said latches is swivelable from said ready position into said working position while at the same time an adjacent latch moves from the rest position into the ready position; a control latch for each of said latches rotatably mounted adjacent each latch; and a weight arranged on each control latch which holds each latch in the ready position, wherein a control latch is arranged on one side of a first latch and the control latch for the adjacent latch is arranged on the opposed side of said first latch.

* * * * *